3,635,924
ALTERNATING COPOLYMERS OF UNSATURATED HALOGENATED HYDROCARBONS AND ACRYLONITRILE OR ACRYLIC COMPOUND
Kohei Nakaguchi, Shohachi Kawasumi, Masaaki Hirooka, and Hiroshi Yabuuchi, Niihama-shi, Japan, assignors to Sumitomo Chemical Company, Ltd., Osaka, Japan
No Drawing. Continuation of application Ser. No. 480,139, Aug. 16, 1965. This application Oct. 21, 1969, Ser. No. 868,243
Claims priority, application Japan, Aug. 18, 1964, 39/47,354
Int. Cl. C08f 15/24, 15/32
U.S. Cl. 260—85.5 XA                          26 Claims

ABSTRACT OF THE DISCLOSURE

Alternating copolymers of acrylonitrile or an acrylic compound and terminally ethylenically unsaturated halogenated hydrocarbon are produced by reacting an unsaturated halogenated hydrocarbon monomer, such as vinyl chloride, vinylidene chloride, allyl chloride or p-iodostyrene, with a conjugated vinyl compound, such as methyl acrylate, n-butyl acrylate, N-ethyl acrylamide, methyl thiolacrylate and acrylonitrile, in the presence of an organoaluminum compound, such as ethylaluminum, sesquichloride, ethylaluminum dichloride, methylaluminium sesquibromide and trialkylaluminum. The reaction may be carried out over a wide range of temperatures ($-150°$ C. to $+100°$ C.) but lower temperatures are preferred. The products in general are characterized by a substantially 1:1 molar ratio of the starting polymers, a high molecular weight and an intrinsic viscosity within the range of from 0.1 to 10.

---

This application is a continuation of application Ser. No. 480,139, filed Aug. 16, 1965, now abandoned.

This invention relates to novel alternating copolymers of an ethylenically unsaturated halogenated hydrocarbon with acrylonitrile or an acrylic compound and to the method for producing a copolymer of an ethylenically unsaturated halogenated hydrocarbon with acrylonitrile or acrylic compound.

A process has been found and proposed by the present inventors for copolymerizing a lower olefin with acrylonitrile in the presence of a catalyst having the general formula:

$$AlR_nX_{3-n}$$

where R is an organic radical, X is a halogen atom and $n$ is an arbitrary number of higher than zero but lower than 3. The characteristics of the above process resides in the successful copolymerization of acrylonitrile with a lower olefin such as propylene and isobutylene, though the former has conventionally been considered not to be polymerized by cationic mechanism and the latter has been in general recognized not to be polymerized by anionic or radical mechanism. Another characteristic of the said process is that the resulting polymer, in general, is a so-called alternating copolymer having alternating sequence of two monomers.

In succession to the above findings, the present inventors have found and disclosed that copolymers of α-olefins and ordinary acrylic acid derivatives are obtained using organo-aluminum halogen compounds as catalysts. Olefins used in the above process are terminal-unsaturated hydrocarbons which are readily polymerized, in general, in the presence of a cationic polymerization catalyst. Comonomers used in combination with said olefins are ordinary acrylic acid derivatives which are well polymerized with an anionic catalyst, contrary to the case of olefins. Namely, the findings was that, in the said systems, alternating copolymers are selectively obtained by the combination of the monomers which are contrary to each other in reactivity, i.e. olefin hydrocarbons are high in cationic polymerizability and vinyl compounds having carbonyl groups are high in anionic polymerizability. This may be considered to be a specific copolymerization reaction achieved by the combination of an olefinic hydrocarbon having low $e$-value and an acrylic acid derivative having high $e$-value in which the $e$-value is expressed by Q–$e$ Scheme of monomer reactivities proposed by Price-Alfrey.

Then, the present inventors further studied to examine what extent in Q–$e$ values of monomers are available and found that, as olefins, even those other than hydrocarbon compounds are usable as well and, particularly, ethylenically unsaturated halogenated hydrocarbon compounds (hereinafter referred to as halogenated olefin) effectively give alternating copolymers with conjugated vinyl compounds such as acrylic compounds or acrylonitrile. Thus, the present inventors have established the present invention. Halogenated olefins are greater in the $e$-value than corresponding olefinic hydrocarbons and most of them have positive values. That is, it has been found that the $e$-value of olefinic compounds is not necessarily required to be negative.

One object of the present invention is to provide novel alternating copolymers of a halogenated olefin with acrylonitrile or an acrylic compound. Another object is to provide a method for producing a copolymer of a halogenated olefin and acrylonitrile or an acrylic compound.

Other objects and features will become clear in the following detailed explanation of the present invention.

The present invention provides an alternating copolymer of an ethylenically unsaturated halogenated hydrocarbon having the general formula:

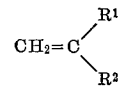

wherein $R^1$ is a halogen atom or a halogenated hydrocarbon radical having 1 to 20 carbon atoms and $R^2$ is hydrogen atom, a halogen atom, a hydrocarbon radical having 1 to 20 carbon atoms or a halogenated hydrocarbon radical having 1 to 20 carbon atoms, and acrylonitrile or an acrylic compound having the general formula:

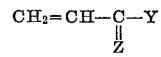

wherein Z is oxgen or sulfur atom and Y is $ZR^3$, ZH, ZMe,

$R^3$, a halogen atom or hydrogen atom, wherein $R^3$ is an organic radical having 1 to 20 carbon atoms; $R^4$ and $R^5$ each is hydrogen atom or an organic radical having 1 to 20 carbon atoms, including the case where $R^4$ and $R^5$ are bound together at the portion other than nitrogen atom; and Me is an ammonium radical or a monovalent portion of an element of groups I to 111 of the Mendeleev's Periodic Table. Further, the present invention provides a method for producing a copolymer which comprises contacting said ethylenically unsaturated halogenated hydrocarbon with acrylonitrile or said acrylic compound in the presence of (1) an organoaluminum halogen compound having the general formula of

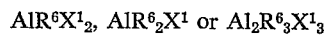

wherein $R^6$ is an ordinary organic radical and $X^1$ is a halogen atom or (2) a combination of at least two kinds of the components of the aluminum compounds having the general formula of $AlR^6X^1{}_2$, $AlR^6{}_2X^1$, $Al_2R^6{}_3X^1{}_3$, $AlR^7{}_3$ or $AlX^2{}_3$, wherein $R^6$ and $R^7$ are an ordinary organic radical and $X^1$ and $X^2$ are a halogen atom.

It has been well known that a random copolymer of halogenated olefins, such as vinyl chloride or vinylidene chloride, with acrylic compound or acrylonitrile is easily obtained by conventional radical copolymerization. It has been however unknown that said monomers are copolymerized in the presence of an aluminum compound as a catalyst and it is a quite unexpected result that the said monomers give alternating copolymers.

It has been well known that alternating copolymers of some specific monomers are selectively obtained by the copolymerization in the presence of a radical catalyst. For example, maleic anhydride, maleimide and fumaric acid chloride, which hardly homopolymerize, are copolymerized with styrene or α-methylstyrene to yield alternating copolymers. It is also known that an ester of fumaric acid is copolymerized with isobutylene or propylene to yield a copolymer having a definite composition independent of the monomer composition. The above-mentioned known alternating copolymerization by radical mechanism is characterized by using such specific monomers as are not homopolymerized and hardly give random copolymers even when the polymerization conditions are varied.

One of the marked characteristics of the present invention resides in that alternating copolymers are selectively obtained by use of the combinations of monomers, which have been known to give random copolymers. The alternating copolymers of this kind are novel compounds which have been unknown hitherto. It may also be said that the above phenomenon is an entirely novel one which has never been seen in the conventional alternating copolymerization.

Further, allyl halides, which are included in the ethylenically unsaturated halogenated hydrocarbon employed in the present invention, tend to cause degradative chain transfer due to the so-called allyl resonance and hence have been considered to be polymerized by radical initiators with great difficulty and give no excellent polymers. This is the same even when ionic catalysts are employed. According to the present invention, however, allyl halides show markedly high polymerization activity to effectively give alternating copolymers.

Recently, there has been proposed an attempt to change the polymerization reactivity of the vinyl monomers, which are generally high in anionic polymerizability, by forming a complex of a vinyl monomer with a metal halide, such as zinc chloride or aluminum chloride.

For example, Kargin et al. have attempted radical homopolymerization by forming a complex of methyl methacrylate and zinc chloride (Vysokomol. Soed. 2, 765 (1960)) and Imoto et al. have reported the details of radical homopolymerization carried out by forming a complex of zinc chloride and acrylonitrile or methyl methacrylate (Makromol. Chem. 65, 174, 180 and 194 (1963)). Further, in a patent, a process of radical copolymerization is disclosed for copolymerizing a first monomer with a second monomer in the presence of a Friedel-Crafts metal halide, e.g. zinc chloride, said first monomer being a polar vinyl or vinylidene monomer and responsive to radical initiation, and the second monomer being an olefin or substituted olefin and responsive to Friedel-Crafts catalysts.

In the method of present invention also, the formation of a complex of an aluminum compound as a catalyst and acrylonitrile or an acrylic compound is considered to be of great importance for the copolymerization. The reason is apparent from the fact that the use of an aluminum compound and an acrylic compound or acrylonitrile at about an equimolar proportion gives favorable results. However, the present invention is markedly different from the aforesaid copolymerization in which a Lewis acid-vinyl monomer complex formed. The present invention is quite unique in the point that the copolymerization reaction quickly occurs without the addition of radical initiator. This is one of the important characteristics of the present invention. As apparent from the above-mentioned characteristics, the persent invention is a novel mode of polymerization which has never been known heretofore.

Aluminum compound forms a complex with an acrylic compound or acrylonitrile. For example, according to the infrared absorption spectrum of acrylonitrile, the absorption of nitrile group at 2220 cm.$^{-1}$ shifts to 2270 cm.$^{-1}$ by the formation of the complex, whereas the absorption of double bond at 1600 cm.$^{-1}$ does not change. From this fact, it is considered that the aluminum compound is coordinated to the nitrile group. It is naturally considered that such a coordination greatly affects the polarity of the acrylic compounds and acrylonitrile which is in close relation to the polymerization activity. However, this kind of complex generally has no polymerization activity by itself. For example, a complex obtained by mixing equimolar amounts of acrylo nitrile and an aluminum compound at −78° C. is solid at low temperatures and liquid at room temperature and yields no polymer when allowed to stand for a long time. On the other hand, even when an halogenated olefin is mixed with an aluminum compound, no polymer is substantially produced in most cases. In the case of an allyl chloride, a vigorous reducing reaction only occurs. However, when a ternary system is formed by mixing an aluminum compound, an acrylic compound or acrylonitrile and a halogenated olefin, the system exhibits high polymerization activity, whereby the polymerization progresses quite rapidly to selectively yield an alternating copolymer. Such many features are specific and have not been seen in conventional polymerization reactions.

The alternating copolymers obtained according to the present invention differ in properties from the respective homopolymers or the random copolymers. The present alternating copolymers, in general, are amorphous and do not have clear melting point. This is observed from the result of differential thermal analysis. It is the further characteristics of the present copolymers that they were characteristics of the present copolymers that they are thermally stable and are decomposed with difficulty even at an elevated temperature. For example, a homopolymer of methyl acrylate decomposes at 350° C. in the atmosphere of nitrogen but an alternating copolymer of the same material with vinyl chloride decomposes appreciably only at 400° C. Further, the solubilities of the copolymers obtained by the present invention in various solvents are different from those of respective homopolymers. This result substantiates that the products of the present invention are copolymers. For example, a homopolymer of vinyl chloride is insoluble in benzene and soluble in cyclohexanone and polymethyl acrylate is insoluble in cyclohexanone, whereas the alternating copolymer of vinyl chloride and methyl acrylate is soluble in both benzene and cyclohexanone. Further, the alternating copolymer is soluble in tetralin, though respective homopolymers are insoluble. The alternating copolymers obtained by the present invention are high in molecular weight, in general, and have an intrinsic viscosity within the range from 0.1 to 10.

As above-mentioned the copolymers of the present invention have various superior characteristic properties. They can find their application in various uses where these characteristic properties are most effectively utilized. Besides this, such characteristics as failed to be attained with individual homopolymers are frequently attained by the copolymerization. Besides the use of copolymers by itself, it is possible to modify the properties of the copolymers by blending with other polymers or by the reaction of the copolymers. For example, a homopolymer having insufficient compatibility with another polymer can be made into a homogeneous poly-blend by changing into a copolymer. It is also possible to convert the copolymers into substances having three dimensional structure by use of a cross-linking agent. In general, the alternating copolymers obtained by the present invention find wide uses a moulding materials, films, sheets, fibers, paints, compounding materials and adhesives.

The ethylenically unsaturated halogenated hydrocarbons employed in the present invention are the compounds having the general formula

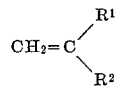

wherein $R^1$ and $R^2$ have the same meanings as identified above. The halogens in the meaning of $R^1$ and $R^2$ include chlorine, bromine, iodine and fluorine. As the hydrocarbon radicals and halogenated hydrocarbon radicals in the meaning of $R^1$ and $R^2$, there may be included those alkyl, alkylaryl and cycloalkyl groups or halogen substituents thereof, or derivatives thereof. These halogenated olefins include, for example, vinyl chloride,
vinyl bromide,
vinyl iodide,
allyl chloride,
allyl bromide,
allyl iodide,
4-chloro-butene-1,
3-chloro-butene-1,
3-bromo-pentene-1,
4,4,4-trichlorobutene-1,
p-chloro-styrene,
o-chloro-styrene,
m-chloro-styrene,
m-bromo-styrene,
p-iodo-styrene,
p-fluoro-styrene,
p-(chloromethyl)-styrene,
4-chloro-1-vinylcyclohexane,
p-chloro-allylbenzene,
2,4-dichloro-styrene,
2,6-dichloro-styrene,
2,4-difluoro-styrene,
3-trifluoromethyl-styrene,
4-chloro-1-vinylnaphthalene,
vinylidene chloride,
vinylidene bromide,
2-chloro-allyl chloride,
methallyl chloride,
1-bromo-1-chloro-ethylene,
1-bromo-1-iodo-ethylene,
1-chloro-1-iodo-ethylene,
2-chloropropene-1,
2-chloro-butene-1,
2-bromo-dodecene-1,
1-chloro-1-cyclohexylethylene,
1-chloro-1-benzylethylene,
α-chloro-p-methylstyrene,
α-bromo-styrene,
α-chloro-styrene,
p-bromo-α-chloro-styrene,
2-chloroallyl chloride,
2,4-dichloro-pentene-1,
2-(chloromethyl)-propene-1,
1,1-bis-(p-chlorophenyl)-ethylene,
α-(bromomethyl)-styrene,
α-(chloromethyl)-styrene,
p-chloro-α-methyl-styrene,
2,3-dichloro-α-methyl-styrene, and
α-ethyl-m-(trichloromethyl)-styrene.

Among the above compounds, those having the e-value of less than 1.0, preferably less than 0.5, give favorable results.

The conjugated monomers used in the present invention are acrylonitrile or an acrylic compound having the general formula

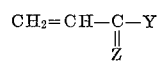

wherein Y and Z have the same meanings as identified above. Such derivatives include acrylate, thiolacrylate, thionacrylate, dithioacrylate, acrylamide, thioacrylamide, N-substituted acrylamide, N-substituted thioacrylamide, N,N-disubstituted acrylamide, N,N-disubstituted thioacrylamide, acrylic acid halide, thioacrylic acid halide, acrylic acid, thiolacrylic acid, thionacrylic acid, dithioacrylic acid, salts of said acids, acrolein and vinyl ketone. As the organic residues having 1 to 20 carbon atoms represented by $R^3$, $R^4$ and $R^5$ described with respect to Y in the above formula, ordinary hydrocarbon radicals are preferred, and their derivative groups thereof may also be included. They are for example, alkyl, aryl, aralkyl, alkylaryl and cycloalkyl groups. As the halogen atom, in the meaning of Y, chlorine, bromine, iodine and fluorine atom may be used. Me described with respect to Y is an ammonium radical or is the monovalent portion of an element of Group I to III of the Mendeleev's Periodic Table. Such element includes, for example, lithium, sodium, potassium, rubidium, cesium, copper, silver, beryllium, calcium, strontium, barium, magnesium, zinc, cadmium, mercury, boron, aluminum and gallium. The term "monovalent portion" referred to herein signifies M itself in the case of a monovalent element, M/2 in the case of a divalent element, and M/3 in the case of a trivalent element. (The said M represents an element of Group I to III of the Mendeleev's Periodic Table). Therefore, in the case of a divalent element, the general formula of the compound corresponds to

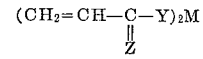

and in the case of a trivalent element to

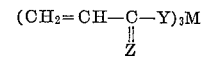

Among these compounds, the monovalent salt, i.e. the salt of the element of Group I of the Mendeleev's Periodic Table, and an ammonium salt are particularly preferred. The aforesaid description "including the case where $R^4$ and $R^5$ are bound together at other portion than nitrogen atom" referred to with respect to $NR^4R^5$, signifies, for example, the case where the groups

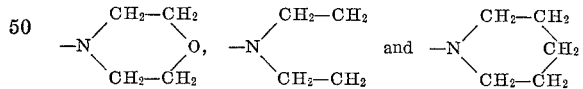

i.e. morpholino, pyrrolidino and piperidino groups are involved. Representative examples of said acrylic compounds are methyl acrylate, ethyl acrylate, isopropyl acrylate, n-butyl acrylate, t-butyl acrylate, n-amyl acrylate, n-octyl acrylate, n-dodecyl acrylate, tetradecyl acrylate, octadecyl acrylate, vinyl acrylate, allyl acrylate, phenyl acrylate, o-tolyl acrylate, benzyl acrylate, cyclohexyl acrylate, cyclopentyl acrylate, (2-chloroethyl) acrylate, (β-chloroallyl) acrylate, (dimethylaminoethyl) acrylate, (2-ethoxyethyl) acrylate, (2-nitropropyl) acrylate, methyl thiolacrylate, ethyl thiolacrylate, isopropyl thiolacrylate, phenyl thiolacrylate, methyl thionacrylate, methyl dithioacrylate, acrylamide, thioacrylamide, N-methyl-acrylamide, N-ethylacrylamide, N-n-butylacrylamide, N-n-hexylacrylamide, N-n-octylacrylamide, N-2-ethylhexyl-acrylamide, N-n-hexylacrylamide, N-n-octylacrylamide, N-2-ethylhexyl-acrylamide, N-n-dodecyl-acrylamide, N-stearyl-acrylamide, N-cyclohexyl-acrylamide, N-tolyl-acrylamide, N-methyl-thioacrylamide, N,N-dimethylacrylamide, N-methyl-N-ethyl-acrylamide, N-acryloyl-morpholine, N-acryloyl-pyrrolidine, N,N-dimethyl-thioacrylamide, acryloyl chloride, acryloyl bromide, acryloyl iodide, thioacryloyl chloride, acrylic acid, thioacrylic acid, thionacrylic acid, dithioacrylic acid, sodium acrylate, potassium acrylate, zinc acrylate, aluminum acrylate, ammonium acrylate, acrolein, methyl vinyl ketone, ethyl vinyl ketone, phenyl vinyl ketone, cyclohexyl vinyl ketone, and vinyl 4-methyl-naphthyl-(1) ketone. However, the acrylic compounds employed in the present invention are not limited to the above compounds.

The aluminum compounds used in the present invention are those of the general formulas, $AlR^6X^1_2$, $AlR^6_2X^1$, $Al_2R^6_3X^1_3$, $AlR^7_3$ and $AlX^2_3$ wherein $R^6$ and $R^7$ each is an ordinary organic radical, and $X^1$ and $X^2$ each is a halogen atom. Said organic radicals include hydrocarbon radicals having 1 to 20 carbon atoms and derivatives thereof, such as, for example, alkyl, alkenyl, aryl, aralkyl, alkylaryl and cycloalkyl groups. The said $R^6$ and $R^7$, in the formulas, include methyl, ethyl, propyl, butyl, hexyl, octyl, decyl, dodecyl, stearyl, phenyl, tolyl, naphthyl, benzyl, cyclopentadienyl and cyclohexyl groups or derivatives thereof. Representative compounds having the general formulas of $AlR^6X^1_2$, $AlR^6_2X^1$ and $Al_2R^6_3X^1_3$ are methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum dibromide, ethylaluminum diiodide, vinylaluminum dichloride, allylaluminum dichloride, ethylaluminum sesquichloride, ethylaluminum sesquibromide, ethylaluminum sesquifluoride, methylaluminum sesquichloride, methylaluminum sesquibromide, phenylaluminum sesquiiodide, diethylaluminum chloride, diethylaluminum fluoride, ethylphenylaluminum chloride, and dicyclohexylaluminum chloride. The representative compounds having the general formula of $AlR^7_3$ are trimethylaluminum, triethylaluminum, tripropylaluminum, tributylaluminum, trihexylaluminum, tridecylaluminum, triphenylaluminum, tricyclohexylaluminum and tribenzylaluminum. Further, the representative compounds having the general formula of $AlX^2_3$ are aluminum trichloride, aluminum tribromide, aluminum triiodide and aluminum trifluoride.

As the aluminum compound used in the present invention, the optional use of each component among those of the formulas $AlR^6X^1_2$, $AlR^6_2X^1$, $Al_2R^6_3X^1_3$, $AlR^7_3$ and $AlX^2_3$ is objectionable. That is, the independent use of an aluminum compound of the formula $AlR^6X^1_2$, $AlR^6_2X^1$ and $Al_2R^6_3X^1_3$ is effective but, when either of the compounds having the formulas $AlR^7_3$ and $AlX^2_3$ is to be used, the aluminum compound should be used in a combination comprising at least two members selected from the components of $AlR^6X^1_2$, $AlR^6_2X^1$, $Al_2R^6_3X^1_3$, $AlR^7_3$ and $AlX^2_3$. For example, the independent use of only $AlR^7_3$ or $AlX^2_3$ does not give the desired copolymer. Namely, in the present invention, it is necessary to use a system consisting of aluminum in combination with organic group and halogen atom. This is one of the characteristics of the present invention. The aluminum compound which is a catalyst component is frequently used at any proportion based on the monomer, e.g. 0.01–10 moles, preferably 0.05–1.5 moles, per mole of the acrylic compound or acrylonitrile. In the present invention, the formation of complex of an acrylic compound or acrylonitrile and an aluminum compound is of importance. When the aluminum compound which is a coordination component is used particularly at about an equimolar proportion to the acrylic compound or acrylonitrile, the copolymerization can be carried out effectively and a copolymer having excellent properties can be obtained. The method of admixing the aluminum compounds with monomers can be effected in any way according to the conventional procedures.

Particularly when the reaction is carried out at a low temperature, the homopolymerization of the individual monomers will not practically occur in most cases. Accordingly it is possible to select any arbitrary order of addition at a low temperature to produce copolymers alone. For example, a process in which the monomers are mixed at first, then solvent if desired and finally the aluminum compound is added thereto—another process in which acrylonitrile or an acrylic compound is admixed with an aluminum compound to produce a complex and a halogenated olefin is added thereto—a further process in which a halogenated olefin is mixed with an aluminum compound at first and acrylonitrile or an acrylic compound is thereto added or continuously dropped—still a further process in which these operations are carried out continuously and reaction product is continuously withdrawn, it is possible to select any of these processes.

But in the case in which the previous contact of an aluminum compound with one monomer is objectionable, an aluminum compound may be previously contacted with the other monomer, or the two monomers may be previously mixed and then the monomer mixture is contacted with an aluminum compound. Further, in the case an aluminum compound comprises a plurality of components, each of the components may be added separately. Even when such procedure is adopted, an active complex is easily formed in the system, in general. When a halogen-containing aluminum component is added to an acrylic compound or acrylonitrile at relatively low temperatures, for instance at a temperature below 0° C., an alternating copolymer is obtained easily and effectively.

According to the present invention, an alternating copolymer is obtained in most cases. It the case in which such alternating copolymer is obtained, the composition of the polymer does not change, independently on the composition of monomers employed. However, the mixing proportion of a halogenated olefin and an acrylic compound or acrylonitrile frequently affects the yield, molecular weight and other properties of the resulting polymer, and a suitable mixing ratio of monomers should be determined depending upon the object. In general, when the halogenated olefin is used excessively over acrylic compound or acrylonitrile, it is possible to increase the polymerization yield based on the acrylic compound or acrylonitrile.

An arbitrary polymerization temperature ranging from as low as —150° C. to as high as +100° C. may be selected. The polymerization system of the present invention is occasionally so active that the polymerization completes within several minutes or several ten minutes even at e.g. —78° C. Since the homopolymerization hardly occurs at such a low temperature, it is suitable to obtain pure copolymer if polymerization is carried out at such a low temperature. The polymerization at a low temperature has also such advantage that monomers being gaseous at room temperature can be subjected to the homogeneous liquid phase polymerization under atmospheric pressure. On the other hand when the condition of low temperature is hardly attained, it is possible to obtain copolymers effectively by carrying out polymerization at room temperature or at a higher temperature than that. It is possible to carry out polymerization under a superatmospheric pressure when monomers are gaseous at room temperatures. It is, in general, necessary to carry out the polymerization in an inert atmosphere. It is suitable to carry out the polymerization in the absence of polar compounds such as water or others.

In the practice of the present invention, it is possible to carry out bulk polymerization in a liquid monomer and also to carry out polymerization in a usual inert vehicle.

Such inert vehicles include common hydrocarbons and halogen-containing hydrocarbons. A typical vehicles are exemplified propane, butane, pentane, hexane, heptane, octane, ligroin, petroleum ether and other petroleum type mixed solvent, benzene, toluene, xylene, cyclohexane, methylcyclohexane, methylene dichloride, ethylene dichloride, trichloroethylene, tetrachloroethylene, butyl chloride, chlorobenzene and bromobenzene. Compounds which form stable complexes with aluminum compound are not favorable as vehicles. Particularly such compounds as are capable to form complexes having bonds stronger and aluminum compound are utterly unsuitable. What are not favorable as vehicles, are ethers such as ethyl ether, tetrahydrofuran or the like. Ketones, nitriles or the like cannot be called suitable ones.

After the completion of polymerization reaction, it is possible to subject resulting polymers to customary after-treatment for purification and recovery. As such after-treatments, those which have been used heretofore in cases of cationic polymerization using Lewis acids and the polymerization using Ziegler-Natta's type catalysts, such as treatment with an alcohol, with an alcohol and hydrochloric acid, with hydrochloric acid, with alkali or the like can be arbitrarily used. It is also possible to separate and recover the aluminum compound from the resulting polymer by e.g. adding a compound capable of forming complex therewith without decomposing it.

Following examples are given to illustrate the present invention but it is by no means intended to be limitative of the invention.

EXAMPLE 1

A 100 ml. three-necked flask was evacuated, flushed with nitrogen and cooled to −78° C. with Dry Ice-methanol. Into the flask, 20 ml. of heptane and 4 g. of methyl acrylate were charged under nitrogen atmosphere and homogeneously mixed. To the mixture was further added 25 mmol. of ethylaluminum sesquichloride ($Al_2Et_3Cl_3$). The temperature was elevated to 0° C. and vinyl chloride in the gaseous state was continuously blown therein to effect the polymerization. 5 hours later, methanol was added to the contents to stop the polymerization. Thereafter the contents were taken out of the flask and insoluble product were recovered by filtration. The solid product was treated with hydrochloric acid-methanol, thoroughly washed with methanol and then dried at 50° C. under reduced pressure to obtain 4.95 g. of a white copolymer.

The resulting copolymer was soluble in benzene and cyclo hexanone and had properties different from either of vinyl chloride homopolymer or methyl acrylate homopolymer. The results of the elementary analysis of the copolymer were C, 48.54%; H, 6.60%, and Cl, 22.68%. These values coincide with the theoretical value of a 1:1 alternating copolymer, C, 48.50%; H, 6.11%, and Cl, 23.86%.

EXAMPLE 2

A 200 ml. three-necked flask equipped with a stirrer was evacuated, flushed with nitrogen and cooled to −78° C. with Dry Ice-methanol. In the flask, 4 g. of methyl acrylate and 30 g. of vinyl chloride were charged under the atmosphere of nitrogen and were maintained at −78° C. To the flask, 50 mmol. of ethylaluminum dichloride was further added and the mixture was subjected to polymerization for 2 hours. After the polymerization, the similar after-treatments as in Example 1 were effected and 6.43 g. of a white, solid copolymer was obtained. From the results of elementary analysis the copolymer was considered as a 1:1 alternating copolymer. The intrinsic viscosity of the copolymer measured at 30° C. in benzene solution was 0.96 dl./g. The similar results were obtained when ethyl acrylate was used under the same conditions in place of the methyl acrylate.

EXAMPLE 3

In similar way as Example 2, 50 mmol. of diethylaluminum chloride was used in place of the ethylaluminum dichloride and 2.74 g. of a copolymer was obtained.

EXAMPLE 4

In similar way as in Example 2, 25 mmol. of methylaluminum sesquibromide was used instead of the ethylaluminum dichloride, and 3.97 g. of a copolymer was obtained. The results of elementary analysis of the copolymer indicated that the product had a composition of 1:1 molar ratio. Further, the intrinsic viscosity of the copolymer measured at 30° C. in benzene solution was 2.76 dl./g.

EXAMPLE 5

A 200 ml. three-necked flask equipped with a stirrer was evacuated, flushed with nitrogen and cooled to −78° C. with Dry Ice-methanol. Into the flask, 2 g. of methyl acrylate and 30 g. of vinyl chloride were charged under atmosphere of nitrogen and maintained at −78° C. To the flask, 12.5 mmol. of ethylaluminum sesquichloride was further added and the mixture was subjected to polymerization for one hour. After the polymerization, the similar after-treatments as in Example 1 were effected and 1.61 g. of a white, solid copolymer was obtained. The result of elementary analysis of the copolymer showed that the product had a composition of 1:1 molar ratio.

EXAMPLE 6

In similar way as in Example 5, the polymerization was conducted using 50 ml. of heptane as a solvent. The polymerization was carried out for one hour and then the similar after-treatments as in Example 1 were conducted and 1.09 g. of a white, solid copolymer was obtained. The result of elementary analysis of the copolymer showed that the product had a composition of 1:1 molar ratio.

EXAMPLE 7

The similar polymerization as in Example 6 was carried out, using 50 ml. of toluene in place of the heptane and 1.03 g. of a white, solid copolymer was obtained. The result of elementary analysis of the copolymer showed that the product had a composition of 1:1 molar ratio. The intrinsic viscosity of the copolymer measured at 30° C. in benzene solution was 0.72 dl./g.

EXAMPLE 8

The similar polymerization as in Example 1 was carried out, except that 3 g. of n-butyl acrylate was used in place of methyl acrylate and the amount of the ethylaluminum sesquichloride was reduced to 12.5 mmol., and 3.38 g. of a copolymer was obtained. The intrinsic viscosity of the copolymer measured at 30° C. in benzene solution was 0.34 dl./g. Further, the result of elementary analysis showed that the product was a copolymer having a composition of 1:1 molar ratio.

EXAMPLE 9

In similar way as in Example 1 the polymerization was conducted, except that 2 g. of N-ethyl acrylamide was used instead of the methyl acrylate and the amount of the ethylaluminum sesquichloride was reduced to 12.5 mmol. and 3.00 g. of a white, solid copolymer was obtained. The similar result was also attained when N,N-dimethyl acrylamide was used in place of the methyl acrylate under the same conditions as above.

EXAMPLE 10

A 100 ml., three-necked flask equipped with a stirrer was evacuated, flushed with nitrogen and cooled to −78° C. with Dry Ice-methanol. Into the flask, 4 g. of methyl acrylate, 15 g. of vinylidene chloride and 20 ml. of heptane were charged under the atmosphere of nitrogen and were maintained at −78° C. To the flask, 25 mmol. of ethylaluminum sesquichloride was further added and the polymerization was effected for 4 hours with stirring. After the polymerization, the similar after-treatments as in Example 1 were conducted and 1.20 g. of a white, solid copolymer was obtained.

The copolymer was soluble in acetone and benzene and the values of elementary analysis were C, 39.11%; H, 4.62%; and Cl, 39.90%. These values coincided with the calculated values of 1:1 copolymer, C, 39.37%; H, 4.41% and Cl, 38.74%.

EXAMPLE 11

A 100 ml., three-necked flask equipped with a stirrer was evacuated, flushed with nitrogen and cooled to −78° C. with Dry Ice-methanol. Into the flask, 3 g. of n-butyl acrylate, 15 g. of allyl chloride and 20 ml. of heptane were charged under the atmosphere of nitrogen and were maintained at −78° C. To the flask, 12.5 mmol. of ethylaluminum sesquichloride was further added and the polymerization was carried out with stirring for 5 hours. After the polymerization, the similar after-treatments as in Example 1 were conducted and 2.48 g. of a copolymer was obtained. The result of elementary analysis of the copolymer was, C, 59.64%; H, 8.49% and Cl, 16.79%. The calculated values of 1:1 copolymer are, C, 58.68%; H, 8.37% and Cl, 17.32%. The copolymer was soluble in acetone and benzene and had an intrinsic viscosity of 0.38 dl./g., when measured at 30° C. in benzene solution.

EXAMPLE 12

The similar polymerization and after-treatments as in Example 10 were effected, except that 3 g. of n-butyl acrylate was used in place of the methyl acrylate and 15 g. of vinyl bromide instead of the vinylidene chloride, and 4.25 g. of a copolymer was obtained. From the result of elementary analysis, the copolymer showed a composition of 1:1 molar ratio.

EXAMPLE 13

A 100 ml., three-necked flask equipped with a stirrer was evacuated, flushed with nitrogen and cooled to −78° C. with Dry Ice-methanol. Into the flask, 2 g. of methyl acrylate, 9.2 g. of 2-chloropropene-1, and 20 ml. of heptane were charged under the atmosphere of nitrogen and were maintained at −78° C. To the flask, 12.5 mmol. of ethylaluminum sesquichloride was further added and the content was stirred for 2 hours to effect the polymerization. After the polymerization, the similar after-treatments as in Example 1 were conducted and 2.78 g. of a white, solid copolymer was obtained. The copolymer was soluble in acetone and benzene and the values of the elementary analysis were C, 52.12%; H, 8.06%, and Cl, 21.99% and well coincided with the calculated value of 1:1 copolymer, C, 51.38%; H, 7.39%, and Cl, 21.67%.

EXAMPLE 14

A 100 ml., three-necked flask equipped with a stirrer was evacuated, flushed with nitrogen and cooled to −78° C. with Dry Ice-methanol. Into the flask, 20 ml. of butyl chloride and 3 g. of methyl thiolacrylate were charged under the atmosphere of nitrogen and were homogeneously mixed. To the mixture, 12.5 mmol. of ethylaluminum sesquichloride was further added. The temperature of the liquid was elevated, with stirring, to 0° C. and 15 g. of p-chloro-styrene was added to the liquid to effect the polymerization. After 2 hours, methanol was added to the content to stop the polymerization. Thereafter, the content was withdrawn out of the flask and insoluble product was recovered by filtration. The resulting solid was treated with hydrochloric acid-methanol, thoroughly washed with methanol and then dried at 50° C. under reduced pressure, whereby 2.50 g. of a white copolymer was obtained.

EXAMPLE 15

A 100 ml., three-necked flask equipped with a stirrer was evacuated, flushed with nitrogen and cooled to −78° C. with Dry Ice-methanol. Into the flask, 50 g. of vinyl chloride and 2 g. of acrylonitrile were charged under the atmosphere of nitrogen and were maintained at −78° C. To the flask, 25 mmol. of methylaluminum sesquibromide was added and the mixture was stirred for 5 hours to effect the polymerization. After the polymerization, the similar after-treatments as in Example 1 were conducted to obtain a white, solid polymer. The polymer was soluble in dimethylformamide and had an intrinsic viscosity of 1.96 dl./g. at 30° C. in dimethylformamide solution. From the result of elementary analysis, it was confirmed that the product was a copolymer having a composition of 1:1 molar ratio.

EXAMPLE 16

A 300 ml. glass autoclave was evacuated, flushed with nitrogen and cooled to −78° C. Into the autoclave, 100 ml. of cyclohexane and 40 mmol. of aluminum chloride were charged under nitrogen atmosphere, and 10.6 g. of acrylonitrile was further added thereto. The temperature was elevated to room temperature while stirring the mixture and then 19.4 g. of vinylidene chloride was charged into the mixture. After cooling the mixture again to −78° C., 40 mmol. of triethylaluminum was added to effect the polymerization at 20° C. for 24 hours. After the reaction, methanol was added to the content to stop the polymerization and insoluble product were recovered by filtration. The resulting solid product was subjected to the similar after-treatment as in Example 1 and 1.32 g. of a solid copolymer was obtained. From the result of infrared absorption spectrum, it was indicated that the product was a 1:1 alternating copolymer. The similar copolymer was obtained when aluminum bromide was used in place of aluminum chloride. On the other hand, the use of trihexyl aluminum or dibutyl aluminum chloride instead of the triethyl aluminum also resulted in the similar copolymer.

EXAMPLE 17

Into a 200 ml., four-necked flask, 20 ml. of toluene and 3 g. of sodium acrylate were charged at 0° C. under the atmosphere of nitrogen and a fine suspension was obtained. To the suspension, 12.5 mmol. of ethylaluminum sesquichloride ($Al_2Et_3Cl_3$) and 15 g. of p-iodostyrene were added, and the mixture was subjected to polymerization, with stirring, for 2 hours and 3.27 g. of a white copolymer was obtained. The similar result was attained when, in place of the sodium acrylate, any of acryloyl chloride, methylvinylketone and acrolein was used under the similar conditions as above.

What is claimed is:

1. A copolymer consisting essentially of 1:1 alternating copolymer of monomer (A) and monomer (B), wherein monomer (A) is an ethylenically unsaturated halogenated hydrocarbon of the formula:

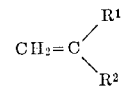

wherein $R^1$ is a halogen atom or a halogenated hydrocarbon radical having 1 to 20 carbon atoms, and $R^2$ is a hydrogen atom, a halogen atom, a hydrocarbon radical having 1 to 20 carbon atoms or a halogenated hydrocarbon radical having 1 to 20 carbon atoms, and wherein monomer (B) is acrylonitrile or an acrylic compound having the formula:

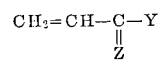

wherein Z is an oxygen or sulfur atom and Y is $ZR^3$, ZH, $-(Z)_k Me$,

$R^3$, a halogen atom or a hydrogen atom, wherein $R^3$ is a hydrocarbon or halohydrocarbon radical having 1 to 20 carbon atoms; $R^4$ and $R^5$ each is a hydrogen atom or a hydrocarbon or halohydrocarbon radical having 1 to 20 carbon atoms, including the case where $R^4$ and $R^5$ are bound together at the portion other than nitrogen atom; and Me is an ammonium radical or an element of Groups I to III of the Mendeleev's Periodic Table, wherein $k$ is equal to the valency of Me.

2. An alternating copolymer according to claim 1, wherein the ethylenically unsaturated halogenated hydrocarbon is a vinyl halide, an allyl halide, a vinylidene halide, a 2-halo-1-olefin, or a halogen-substituted styrene, and the conjugated vinyl compound is acrylic acid, a salt of acrylic acid, an acryloyl halide, an acrylic ester, a thioacrylic ester, acrylamide, an N-substituted acrylamide, acrolein, or a vinyl ketone.

3. A copolymer consisting essentially of 1:1 alternating copolymer of monomer (A) and monomer (B), wherein monomer (A) is an ethylenically unsaturated halogenated hydrocarbon of the formula:

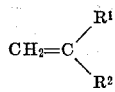

wherein $R^1$ is a halogen atom or a halogenated hydrocarbon radical having 1 to 20 carbon atoms, and $R^2$ is a hydrogen atom, a halogen atom, a hydrocarbon radical having 1 to 20 carbon atoms or a halogenated hydrocarbon radical having 1 to 20 carbon atoms, and wherein monomer (B) is an acrylic compound having the general formula:

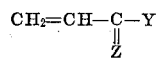

wherein Z is an oxygen or sulfur atom and Y is $ZR^3$, $ZH$, $-Z)_k Me$,

a halogen atom or a hydrogen atom, wherein $R^3$ is a hydrocarbon or halohydrocarbon radical having 1 to 20 carbon atoms; $R^4$ and $R^5$ each is a hydrogen atom or a hydrocarbon or halohydrocarbon radical having 1 to 20 carbon atoms, including the case where $R^4$ and $R^5$ are bound together at the portion other than nitrogen atom; and Me is an ammonium radical or an element of Groups I to III of the Mendeleev's Periodic Table, wherein $k$ is equal to the valency of Me.

4. An alternating copolymer according to claim 3, wherein the ethylenically unsaturated halogenated hydrocarbon is a vinyl halide, an allyl halide, a vinylidene halide, a 2-halo-1-olefin, or a halogen-substituted styrene.

5. An alternating copolymer according to claim 3, wherein the ethylenically unsaturated halogenated hydrocarbon is vinyl chloride, vinyl bromide, allyl chloride, vinylidene chloride, 2-chloro-propene-1, p-chlorostyrene or p-iodostyrene.

6. A method for producing an alternating copolymer which comprises contacting at a temperature of from about $-150°$ C. to about $+100°$ C., an ethylenically unsaturated halogenated hydrocarbon having the general formula:

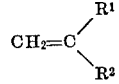

wherein $R^1$ is a halogen atom or a halogenated hydrocarbon radical having 1 to 20 carbon atoms, and $R^2$ is a hydrogen atom, a halogen atom, a hydrocarbon radical having 1 to 20 carbon atoms or a halogenated hydrocarbon radical having 1 to 20 carbon atoms, and an acrylic compound having the general formula:

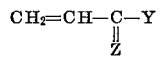

wherein Z is an oxygen or sulfur atom and Y is $ZR^3$, $ZH$, $-Z)_k Me$,

$R^3$, a halogen atom or a hydrogen atom, wherein $R^3$ is hydrocarbon or halohydrocarbon radical having 1 to 20 carbon atoms, $R^4$ and $R^5$ each is a hydrogen atom or a hydrocarbon or halohydrocarbon radical having 1 to 20 carbon atoms, including the case where $R^4$ and $R^5$ are bound together at the portion other than nitrogen atom; and Me is an ammonium radical or an element of Groups I to III of the Mendeleev's Periodic Table, wherein $k$ is equal to the valency of Me in the presence of (1) an organo-aluminum halogen compound having the general formula of $AlR^6X^1_2$, $AlR^6_2X^1$ or $Al_2R^6X^1_3$ wherein $R^6$ is a hydrocarbon radical having 1 to 20 carbon atoms and $X^1$ is a halogen atom, or (2) a combination of at least two kinds of the components of the aluminum compounds having the general formula: $AlR^6X^1_2$, $AlR^6_2X^1$, $$Al_2R^6_3X^1_3$$

$AlR^7_3$ or $AlX^2_3$, wherein $R^6$ and $R^7$ are hydrocarbon radicals having 1 to 20 carbon atoms and $X^1$ and $X^2$ are halogen atoms, wherein the concentration of the aluminum compounds of (1) or (2) is from 0.01 to 10 moles per mole of the acrylic compound.

7. A method according to claim 6, wherein the aluminum compound is ethylaluminum dichloride, ethylaluminum sesquichloride, methylaluminum sesquibromide, diethylaluminum chloride, aluminum chloride-triethylaluminum, aluminum bromide-triethylaluminum, aluminum chloride-dibutylaluminum chloride or aluminum chloride-trihexylaluminum.

8. A method according to claim 6, wherein the ethylenically unsaturated halogenated hydrocarbon is added after the contact of the acrylic compound and the halogen-containing aluminum compound.

9. A method according to claim 6, wherein the ethylenically unsaturated halogenated hydrocarbon is added to the complex of the acrylic compound and the halogen-containing aluminum compound.

10. A method according to claim 6, wherein the acrylic compound is mixed with the ethylenically unsaturated halogenated hydrocarbon, and the aluminum compound is added to the mixture.

11. A method according to claim 6, wherein the ethylenically unsaturated halogenated hydrocarbon is used in excess of the acrylic compound.

12. A method according to claim 6, wherein the copolymerization is effected in the absence of vehicle.

13. A method according to claim 6, wherein the copolymerization is effected using a vehicle of inert hydrocarbons or halogenated hydrocarbons.

14. A method according to claim 6, wherein the halogen-containing aluminum compound is used in an amount substantially equimolar to the amount of the acrylic compound.

15. A copolymer consisting essentially of a 1:1 alternating copolymer of acrylonitrile and a halogenated olefin having the formula:

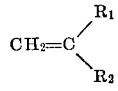

wherein $R^{1'}$ is a halogen atom and $R^2$ is a hydrogen atom, a halogen atom, a hydrocarbon group having 1 to 20 carbon atoms or a halogen-containing hydrocarbon group having 1 to 20 carbon atoms.

16. An alternating copolymer according to claim 15, wherein the halogenated olefin is a vinyl halide, a vinylidene halide or an allyl halide.

17. An alternating copolymer according to claim 15, wherein the halogenated olefin is vinyl chloride, vinyl bromide, allyl chloride or vinylidene chloride.

18. A method for producing an alternating copolymer, which comprises contacting at a temperature of $-150°$ C. to $+100°$ C. acrylonitrile and a halogenated olefin having the formula:

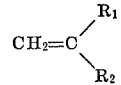

wherein $R^{1'}$ is a halogen atom and $R^2$ is a hydrogen atom, a halogen atom, a hydrocarbon group having 1 to 20 carbon atoms or a halogen-containing hydrocarbon group having 1 to 20 carbon atoms in the presence of (1) an organoaluminum halogen compound having the formula: $AlR^6X^1_2$, $AlR^6_2X^1$ or $Al_2R^6X^1_3$, wherein $R^6$ is a hydrocarbon radical having 1 to 20 carbon atoms and $X^1$ is a halogen atom, or (2) a combination of at least two kinds of the components of the aluminum compounds having the formula: $AlR^6X^1_2$, $AlR^6_2X^1$, $AlR^6_3X^1_3$, $AlR^7_3$ or $AlX^2_3$, wherein $R^6$ and $R^7$ are hydrocarbon radicals having 1 to 20 carbon atoms and $X^1$ and $X^2$ are halogen atoms, wherein the concentration of the aluminum compounds of (1) or (2) is from 0.01 to 10 moles per mole of acrylonitrile.

19. A method according to claim 18, wherein the aluminum compound is ethylaluminum dichloride, ethylaluminum sesquichloride, methylaluminum sesquibromide, diethylaluminum chloride, aluminum chloride-triethylaluminum, aluminum bromide-triethylaluminum, aluminum chloride-dibutylaluminum chloride or aluminum chloride-trihexylaluminum.

20. A method according to claim 18, wheerin the halogenated olefin is added after the contact of acrylonitrile with the halogen-containing aluminum compound.

21. A method according to claim 18, wherein the halogenated olefin is added to a complex of acrylonitrile and the halogen-containing aluminum compound.

22. A method according to claim 18, wherein acrylonitrile is mixed with the halogenated hydrocarbon, and the aluminum compound is then added to the resulting mixture.

23. A method according to claim 18, wherein the halogenated olefin is used in excess of the amount of acrylonitrile.

24. A method according to claim 18, wherein the copolymerization is effected in the absence of a vehicle.

25. A method according to claim 18, wherein the copolymerization is effected using a vehicle of inert hydrocarbons or halogenated hydrocarbons.

26. A method according to claim 18, wherein the halogen-containing aluminum compound is used in amount substantially equimolar to the amount of acrylonitrile.

References Cited
UNITED STATES PATENTS

| | | | |
|---|---|---|---|
| 3,127,380 | 3/1964 | Welch | 260—85.5 |
| 3,159,607 | 12/1964 | DiAlelio | 260—82.1 |
| 3,169,079 | 2/1965 | Ferrington et al. | 117—124 |
| 3,183,217 | 5/1965 | Serniuk et al. | 260—85.5 |
| 3,326,870 | 6/1967 | Nakaguchi et al. | 260—85.5 |

WILLIAM H. SHORT, Primary Examiner

L. L. LEE, Assistant Examiner

U.S. Cl. X.R.

260—32.6 UA, 32.8 R, 33.6 UA, 63 HA, 73 R, 79.7, 86.3, 87.5 R, 87.5 A, 87.5 E, 87.7, 88.3 R, 89.7 R